(12) United States Patent
Kim et al.

(10) Patent No.: US 9,660,255 B2
(45) Date of Patent: *May 23, 2017

(54) WRAPPING ELECTRODE ASSEMBLY AND METHOD FOR MANUFACTURING THE SAME

(71) Applicant: ROUTEJADE INC., Nonsan-si (KR)

(72) Inventors: Kyung Joon Kim, Incheon (KR); In Joong Kim, Nonsan-si (KR); Young Ho Jung, Gyeryong-si (KR)

(73) Assignee: ROUTEJADE INC., Nonsan-si (KR)

(*) Notice: Subject to any disclaimer, the term of this patent is extended or adjusted under 35 U.S.C. 154(b) by 114 days.

This patent is subject to a terminal disclaimer.

(21) Appl. No.: 14/427,107

(22) PCT Filed: Sep. 10, 2013

(86) PCT No.: PCT/KR2013/008161
§ 371 (c)(1),
(2) Date: Mar. 10, 2015

(87) PCT Pub. No.: WO2014/042398
PCT Pub. Date: Mar. 20, 2014

(65) Prior Publication Data
US 2015/0228963 A1 Aug. 13, 2015

(30) Foreign Application Priority Data

Sep. 11, 2012 (KR) .................. 10-2012-0100330

(51) Int. Cl.
*H01M 4/02* (2006.01)
*H01M 4/13* (2010.01)
(Continued)

(52) U.S. Cl.
CPC .............. *H01M 4/13* (2013.01); *H01M 2/14* (2013.01); *H01M 2/1673* (2013.01); *H01M 2/18* (2013.01);
(Continued)

(58) Field of Classification Search
CPC .......... H01M 4/13; H01M 4/139; H01M 2/14; H01M 2/1673; H01M 2/18; H01M 10/0585; H01M 10/0486
See application file for complete search history.

(56) References Cited

U.S. PATENT DOCUMENTS 6,881,233 B2 4/2005 Cho et al.
2001/0049872 A1* 12/2001 Hong .................. H01M 2/1686
29/623.3

(Continued)

FOREIGN PATENT DOCUMENTS

JP 57062371 9/1980
JP 10275628 10/1998
(Continued)

OTHER PUBLICATIONS

International Search Report—PCT/KR2013/008161 dated Dec. 24, 2013.

*Primary Examiner* — Jonathan Jelsma
(74) *Attorney, Agent, or Firm* — Cantor Colburn LLP

(57) ABSTRACT

A wrapping electrode assembly for use in a secondary battery manufactured by an electrode-stacking method includes: an electrode plate which has a coating layer of an electrode active material and a non-coated protruding portion, the electrode active material being capable of reversibly inserting and extracting lithium ions; first and second separator films which cover both surfaces of the electrode plate while exposing only the non-coated protruding portion; and an insulating polymer film which is positioned between the first separator film and the second separator film at least (Continued)

on a portion of a circumference of the electrode plate to be bonded to the first separator film and the second separator film, wherein the insulating polymer film is formed as being divided into at least two parts.

7 Claims, 5 Drawing Sheets

(51) Int. Cl.
  *H01M 2/02*   (2006.01)
  *H01M 2/14*   (2006.01)
  *H01M 10/0525*   (2010.01)
  *H01M 2/18*   (2006.01)
  *H01M 4/04*   (2006.01)
  *H01M 4/139*   (2010.01)
  *H01M 10/0585*   (2010.01)
  *H01M 2/16*   (2006.01)
  *H01M 10/04*   (2006.01)
(52) U.S. Cl.
  CPC ......... *H01M 4/0404* (2013.01); *H01M 4/139* (2013.01); *H01M 10/049* (2013.01); *H01M 10/0436* (2013.01); *H01M 10/0486* (2013.01); *H01M 10/0525* (2013.01); *H01M 10/0585* (2013.01); *H01M 10/0404* (2013.01); *H01M 2220/30* (2013.01); *Y10T 156/10* (2015.01)

(56) References Cited

U.S. PATENT DOCUMENTS

2002/0041999 A1   4/2002   Moutsios et al.
2002/0182490 A1*   12/2002   Cho ........................ H01M 4/13
                                 429/144

FOREIGN PATENT DOCUMENTS

| JP | 2004509443 | 3/2004 |
| KR | 1020010086415 | 9/2001 |
| KR | 20110138718 | 12/2011 |
| KR | 20110138719 | 12/2011 |
| KR | 1020110138718 | 12/2011 |
| KR | 1020110138719 | 12/2011 |
| KR | 1020120078826 | 7/2012 |
| WO | 0225758 | 3/2002 |

* cited by examiner

WRAPPING ELECTRODE ASSEMBLY AND METHOD FOR MANUFACTURING THE SAME

TECHNICAL FIELD

The present invention relates to a wrapping electrode assembly used in a secondary battery and a method for manufacturing the same, and more particularly, to a wrapping electrode assembly which does not require a process for punching or perforating an insulating polymer film to accommodate an electrode plate and makes it possible to prevent the insulating polymer film from being wasted and a method for manufacturing the same.

BACKGROUND ART

As the markets for portable electronic devices such as mobile phones, camcorders and notebook computers have been expanded and diversified, the demand for a rechargeable secondary battery for power supply has also been increasing. Due to miniaturization, weight-lightening, high performance, and multiple functions of portable electronic devices, a secondary battery used as a power supply source has been required to be continuously improved in energy storage density. Therefore, years of research to meet such a requirement have yielded the current lithium ion secondary battery that adopts a carbon anode into and from which lithium can be reversibly inserted and extracted and a cathode material into and from which lithium can be reversibly inserted and extracted.

The lithium ion secondary battery has a higher energy density per unit weight and increased charge and discharge lifetime as compared with the existing aqueous solution type secondary batteries such as nickel-cadmium and nickel-hydrogen secondary batteries, and thus has been recently substituted as a new energy source for portable electronic devices for the existing batteries. However, along with the rapid development and diversification of portable electronic devices, a demand for batteries with a higher energy density and various sizes is rapidly increasing. Thus, the current lithium ion secondary battery does not meet such a demand.

In particular, the rapid trend to manufacture slim and small electronic devices increases demands for slim lithium ion secondary batteries having a small thickness. However, adoption of the existing manufacturing methods for cylindrical or prismatic lithium ion secondary batteries may cause drastic lowering of energy density per volume in manufacturing slim batteries. Therefore, it is considered that the development of a slim lithium ion secondary battery with a higher energy density per unit volume is essential in achieving miniaturization, weight-lightening, and slimming of various portable electronic devices.

In order to increase an energy density per unit volume of a secondary battery, it is necessary to accurately laminate or stack a cathode plate, a separator film, and an anode plate. That is, it is necessary to laminate or stack an electrode plate while an area of the anode plate is maintained to be greater than a coating area of a cathode active material on the cathode plate. If an active material coating portion on the cathode plate is not accurately positioned within the anode plate while the cathode plate and the anode plate are laminated or stacked, the performance of the battery may deteriorate.

In Korean Patent No. 10-0337707, the applicant of the present invention suggested a pocketing electrode plate in which any one of a cathode electrode plate or an anode electrode plate is wrapped with a separator film and an insulating polymer film to accurately laminate or stack the cathode electrode plate and the anode electrode plate. In order to form the pocketing electrode plate, it is necessary to form multiple punched spaces in the insulating polymer film for accommodating an electrode plate. In this process, the insulating polymer film is wasted. That is, the insulating polymer film corresponding to the punched spaces is not used but wasted.

DISCLOSURE

Technical Problem

The present invention is suggested to solve the above-described problem, and provides a wrapping electrode assembly which does not require a process for punching or perforating an insulating polymer film and a method for manufacturing the same.

The present invention provides a wrapping electrode assembly which makes it possible to prevent an insulating polymer film from being wasted and a method for manufacturing the same.

Technical Solution

According to an exemplary embodiment of the present invention to achieve the above-described object, there is provided a wrapping electrode assembly for use in a secondary battery manufactured by an electrode-stacking method, the wrapping electrode assembly including: an electrode plate which has a coating layer of an electrode active material and a non-coated protruding portion, the electrode active material being capable of reversibly inserting and extracting lithium ions; first and second separator films which cover both surfaces of the electrode plate while exposing only the non-coated protruding portion; and an insulating polymer film which is positioned between the first separator film and the second separator film at least on a portion of a circumference of the electrode plate to be bonded to the first separator film and the second separator film, wherein the insulating polymer film may be formed as being divided into at least two parts.

Since the insulating polymer film wrapping the electrode plate is formed as being divided, it is possible to remove a process for punching or perforating the insulating polymer film to form a space for accommodating the electrode plate and also possible to prevent the insulating polymer film from being wasted during the punching or perforating process.

The insulating polymer film may include a first member to a fourth member respectively arranged on side surfaces of the electrode plate along a thickness direction, and both surfaces of the first member to the fourth member in a thickness direction may be coated with an adhesive.

The insulating polymer film may include a first member to a fourth member respectively arranged on side surfaces of the electrode plate along a thickness direction, and the first separator film and the second separator film facing both surfaces of the first member to the fourth member in a thickness direction may be coated with an adhesive.

Any one of the first member to the fourth member may include a tab accommodating portion for accommodating a tab of the electrode plate.

The first member to the fourth member may be arranged to be in close contact with the adjacent members.

The first member to the fourth member may be arranged to have a gap between the adjacent members.

The electrode plate coated by the first separator film and the second separator film may be formed to have a size smaller than that of another electrode plate which is not coated by the first separator film and the second separator film.

The first separator film or the second separator film may be formed to have the maximum projected area so as to be equivalent to that of the another electrode plate.

The insulating polymer film may include any one selected from the group consisting of a polyolefin resin film, a polyester resin film, a polystyrene resin film, a polyimide film, a polyamide film, a fluorocarbon resin film, an ABS film, a polyacrylic film, an acetal-based film, and a polycarbonate film.

The insulating polymer film may contain any one adhesive component selected from a high temperature fused adhesive group consisting of ethylene vinyl acetate, ethylene ethyl acetate, an ethylene acrylic acid-based compound, an ionomer-based compound, polyethylene, polyvinylacetate, and polyvinylbutyral.

Meanwhile, according to another aspect of the present invention, the present invention may provide a method for manufacturing a wrapping electrode assembly for use in a secondary battery manufactured by an electrode-stacking method, the method including: a step of preparing a plurality of electrode plates having the same shape, each of which has a coating layer of an electrode active material and a non-coated protruding portion, the electrode active material being capable of reversibly inserting and extracting lithium ions; a step of preparing an insulating polymer film which is formed as being divided into at least two parts so as to form a space for accommodating the electrode plate; a step of preparing tape-shaped first separator film and second separator film each positioned on upper surfaces and lower surfaces of the electrode plate and the insulating polymer film; a step of bonding any one separator film positioned under the insulating polymer film among the first separator film and the second separator film to the insulating polymer film; a step of positioning the electrode plate within the space formed by the insulating polymer film; and a step of bonding the other one separator film positioned on the insulating polymer film among the first separator film and the second separator film to the insulating polymer film.

In the step of bonding any one separator film positioned under the insulating polymer film among the first separator film and the second separator film to the insulating polymer film, the one separator film positioned under the insulating polymer film among the first separator film and the second separator film or the insulating polymer film may be coated with an adhesive, and then, the insulating polymer film may be positioned on the separator film so as to form the space for accommodating the electrode plate.

In the step of bonding any one separator film positioned under the insulating polymer film among the first separator film and the second separator film to the insulating polymer film, a first member to a fourth member of the insulating polymer film respectively arranged on side surfaces of the electrode plate along a thickness direction may be coated with an adhesive using an adhesive injecting device configured to inject the adhesive along a longitudinal direction of the first member to the fourth member.

In the step of bonding the other one separator film positioned on the insulating polymer film among the first separator film and the second separator film to the insulating polymer film, the insulating polymer film and the separator film may be allowed to pass through a pressure roller while being heated.

Advantageous Effects

As described above, the wrapping electrode assembly and the method for manufacturing the same according to the present invention make it possible to omit a process for punching or perforating the insulating polymer film.

The wrapping electrode assembly and the method for manufacturing the same according to the present invention can reduce the material cost of the insulating polymer film since it is possible to prevent the insulating polymer film from being wasted due to a punching or perforating process.

The wrapping electrode assembly and the method for manufacturing the same according to the present invention is not greatly limited in a size of the electrode plate, and, thus, it is possible to manufacture electrodes in various sizes using the same manufacturing equipment.

BEST MODE

Figure 1:
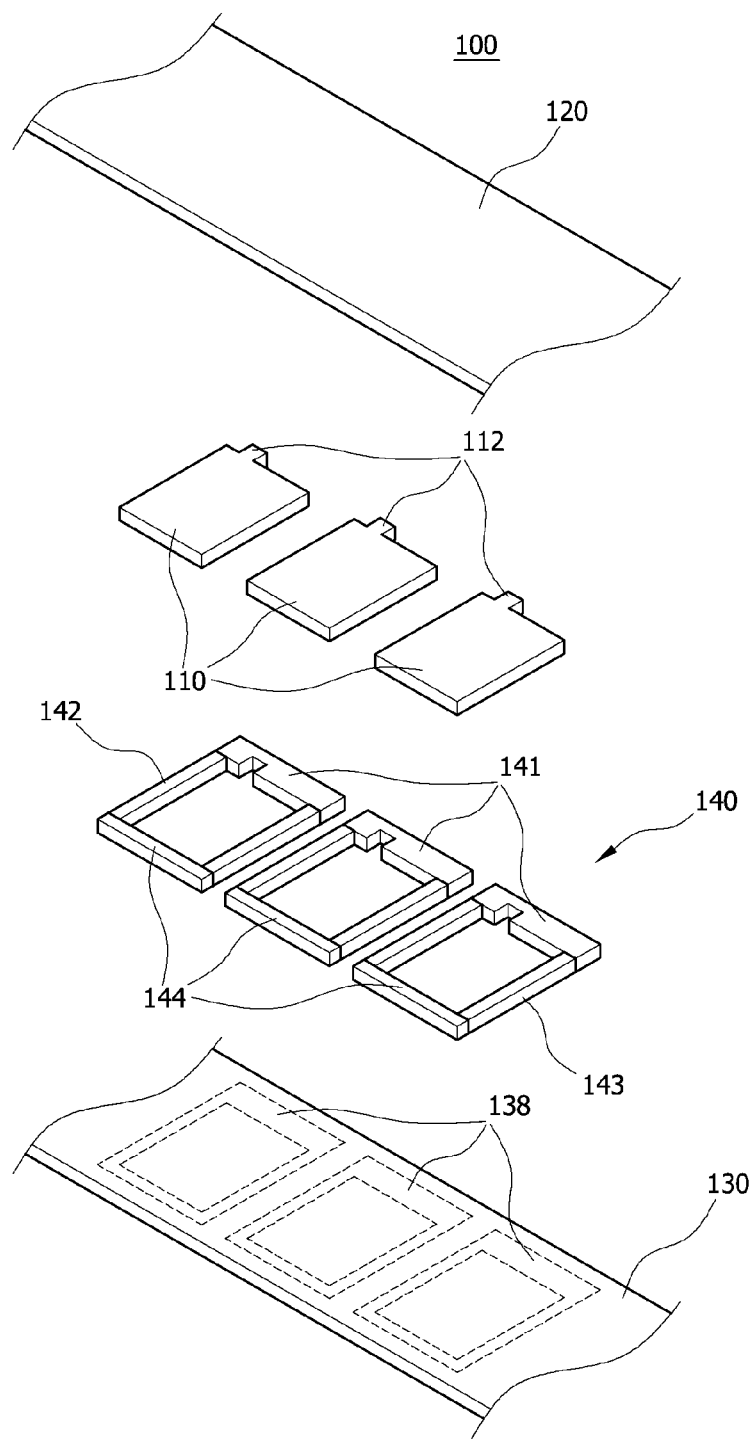
FIG. 1 is an exploded perspective view illustrating a wrapping electrode assembly according to an exemplary embodiment of the present invention.

Hereinafter, exemplary embodiments of the present invention will be described in detail with reference to the accompanying drawings. However, the present invention will not be limited to the following exemplary embodiments. The same reference numerals in each drawing represent the same elements, respectively.

Figure 2:
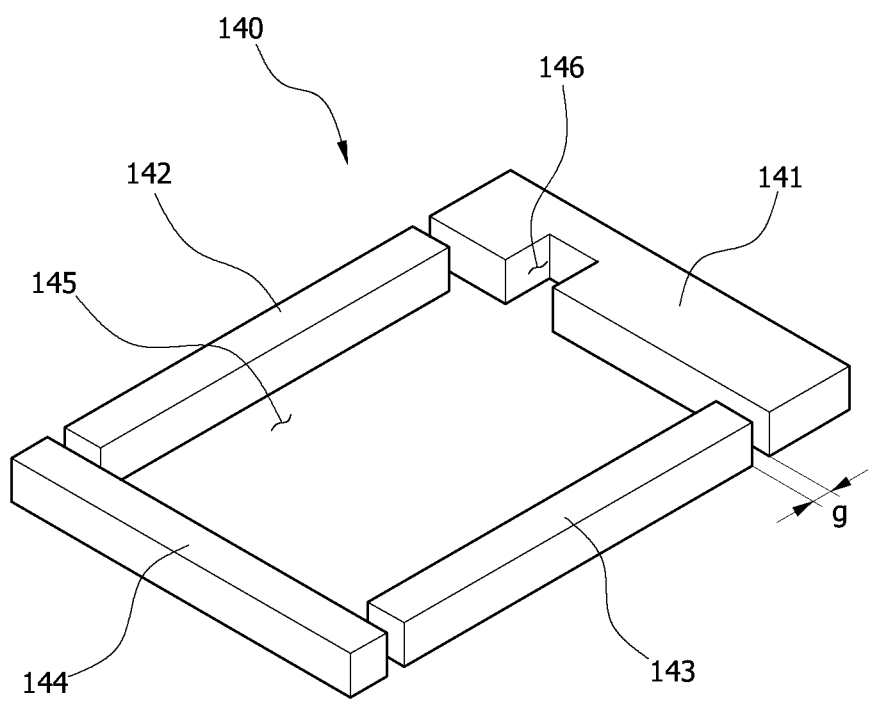
FIG. 2 is a perspective view illustrating an insulating polymer film according to an exemplary embodiment of the present invention.
Figure 3:
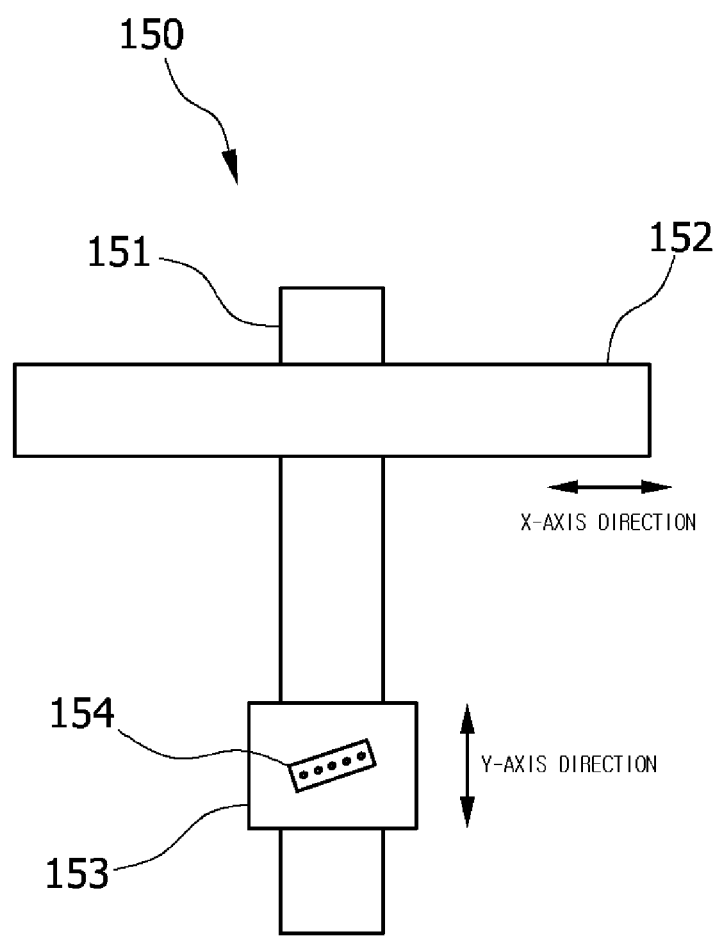
FIG. 3 is a diagram schematically illustrating an adhesive injecting device used for manufacturing the wrapping electrode assembly according to an exemplary embodiment of the present invention.
Figure 4:
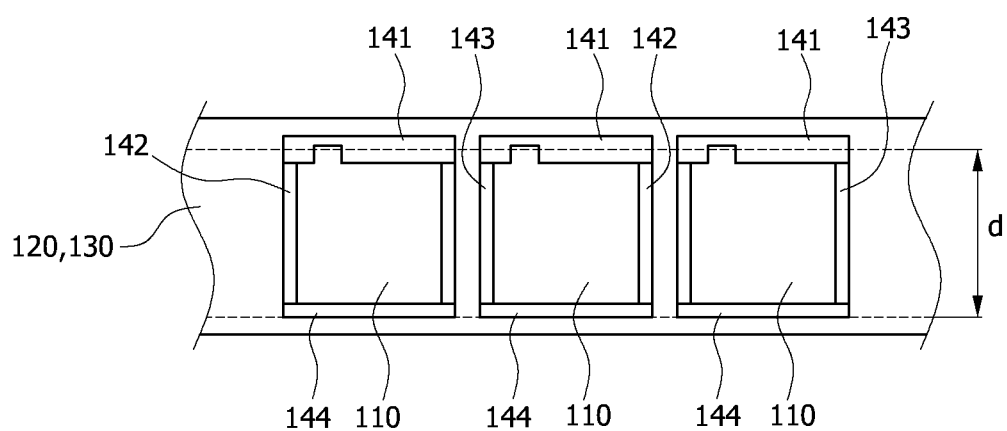
FIG. 4 to FIG. 6 are diagrams illustrating a process for manufacturing a wrapping electrode assembly according to an exemplary embodiment of the present invention.
Figure 5:
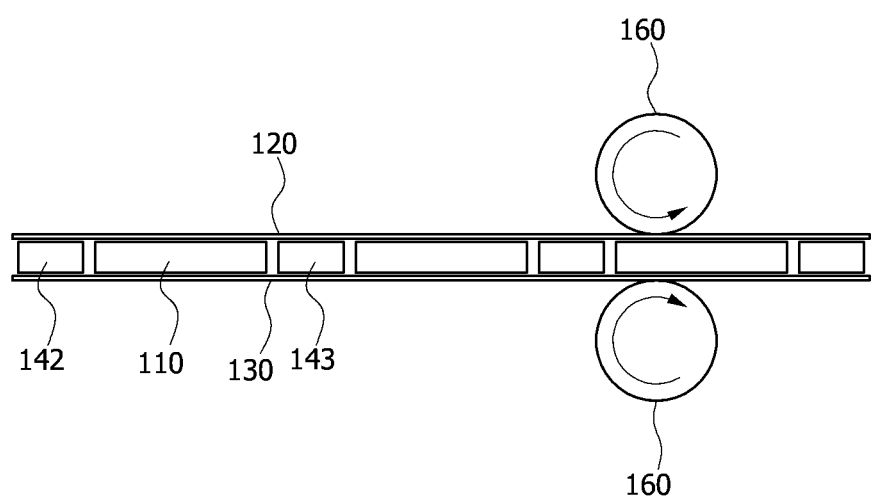
Figure 6:
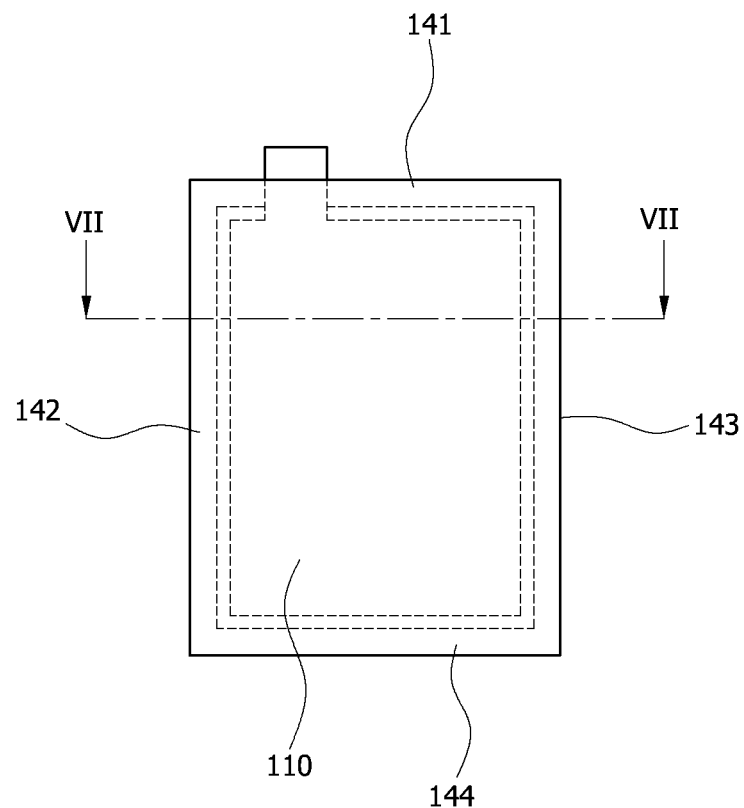
Figure 7:
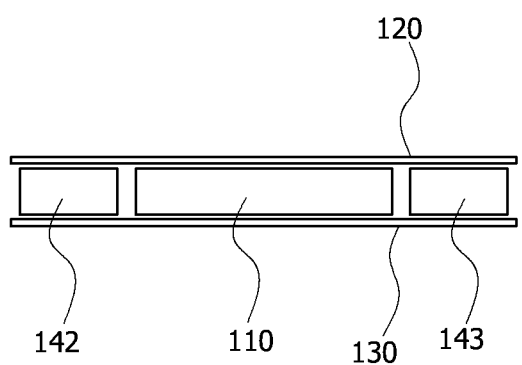
FIG. 7 is a cross-sectional view taken along a line VII-VII of FIG. 6.

FIG. 1 is an exploded perspective view illustrating a wrapping electrode assembly according to an exemplary embodiment of the present invention, FIG. 2 is a perspective view illustrating an insulating polymer film according to an exemplary embodiment of the present invention, FIG. 3 is a diagram schematically illustrating an adhesive injecting device used for manufacturing the wrapping electrode assembly according to an exemplary embodiment of the present invention, FIG. 4 to FIG. 6 are diagrams illustrating a process for manufacturing a wrapping electrode assembly according to an exemplary embodiment of the present invention, and FIG. 7 is a cross-sectional view taken along a line VII-VII of FIG. 6.

According to an exemplary embodiment of the present invention, a wrapping electrode assembly 100 is used in a secondary battery, particularly, a lithium ion secondary battery. The secondary battery may include a can (not illustrated) configured to accommodate an electrode assembly (not illustrated) including the wrapping electrode assembly 100 and a cap (not illustrated) configured to seal the can. The cap and the can are made of a metallic material such as stainless steel, and the can may include a space for accommodating the electrode assembly.

Meanwhile, the wrapping electrode assembly 100 according to the exemplary embodiment of the present invention constitutes an electrode assembly, and the electrode assembly may be formed by stacking the wrapping electrode assembly 100 and a bare electrode plate (an electrode plate which is not wrapped with the separator film) in sequence several times. Herein, the wrapping electrode assembly 100 may be referred to as "pocketing electrode plate".

The wrapping electrode assembly 100 according to the exemplary embodiment of the present invention may be used in a coin type or button type small battery or may be used in a large battery having a large capacity with a slim and wide area. Herein, more preferably, the wrapping electrode assembly 100 according to the exemplary embodiment of the present invention may be used in a large battery. Hereinafter, the wrapping electrode assembly 100 applied to a square electrode plate 110 used in a large battery will be described.

As illustrated in FIG. 1, a wrapping electrode assembly 100 according to the exemplary embodiment of the present invention for use in a secondary battery manufactured by an electrode-stacking method may include: an electrode plate 110 which has a coating layer of an electrode active material and a non-coated protruding portion 112, the electrode active material being capable of reversibly inserting and extracting lithium ions; first and second separator films 120 and 130 which cover both surfaces of the electrode plate 110 while exposing only the non-coated protruding portion 112; and an insulating polymer film 140 which is positioned between the first separator film 120 and the second separator film 130 at least on a portion of a circumference of the electrode plate 110 to be bonded to the first separator film 120 and the second separator film 130.

Herein, the insulating polymer film 140 may be formed as being divided into at least two parts.

Since the insulating polymer film 140 wrapping the electrode plate 110 is formed as being divided, it is possible to remove a process for punching or perforating the insulating polymer film 140 to form a space for accommodating the electrode plate 110 and also possible to prevent the insulating polymer film 140 from being wasted during the punching or perforating process.

The both surfaces of the electrode plate 110 coated with the active material may be covered by two separator films, that is, the first separator film 120 and the second separator film 130. In this case, at least a part of an edge of the first separator film 120 and the second separator film 130 may be bonded to each other. For example, the first and second separator films 120 and 130 may be bonded to each other so as to wrap at least one of the other three edges of the electrode plate 110 except the edge where the non-coated protruding portion 112 is formed.

More preferably, the wrapping electrode assembly 100 according to the exemplary embodiment of the present invention may be formed such that the electrode plate 110 and the insulating polymer film 140 are positioned between the first separator film 120 and the second separator film 130. That is, the first separator film 120 and the second separator film 130 may be bonded to the insulating polymer film 140 positioned therebetween.

The electrode plate 110 is positioned between the first separator film 120 and the second separator film 130. In this case, assuming that surfaces of the first separator film 120 and the second separator film 130 facing the electrode plate 110 are inner surfaces and the other surfaces are outer surfaces, the insulating polymer film 140 is positioned between the inner surfaces of the first separator film 120 and the second separator film 130.

Meanwhile, referring to FIG. 1 and FIG. 2, the insulating polymer film 140 may be formed as being divided into at least two parts rather than being integrated as one body. As such, an accommodating space 145 of the electrode plate 110 is formed using the insulating polymer film 140 formed as being divided into at least two parts, and, thus, it is not necessary to punch the insulating polymer film 140 in order to form the accommodating space 145 of the electrode plate 110 and also possible to prevent the insulating polymer film 140 corresponding to the accommodating space 145 from being wasted.

The insulating polymer film 140 illustrated in FIG. 2 may include a first member to a fourth member 141 to 144 respectively arranged on side surfaces of the electrode plate 110 along a thickness direction. Herein, the first member to the fourth member 141, 142, 143, and 144 are formed so as to respectively face the edges of the square-shaped electrode plate 110. That is, the first member to the fourth member 141 to 144 may be arranged in an approximately square form so as to wrap the electrode plate 110. Since the first member to the fourth member 141 to 144 are arranged in a square form, the accommodating space 145 for accommodating the electrode plate 110 can be formed therein.

Referring to FIG. 2, the first member 141 and the fourth member 144 of the insulating polymer film 140 are arranged to face each other, and the second member and the third member 142 and 143 are placed therebetween. Herein, preferably, the second member 142 and the third member 143 are placed so as not to protrude beyond the first member 141 and the fourth member 144.

It can be seen that the second member to the fourth member 142 to 144 are formed into an approximately stick shape (or a square pillar shape), whereas the first member 141 is formed to be wider than the other members 142 to 144. Since the first member 141 includes a tab accommodating portion 146 for accommodating the non-coated protruding portion 112 of the electrode plate 110, preferably, the first member 141 may be formed to be wider than the other members 142 to 144. However, the first member 141 may be omitted, or the first member 141 having the same width as the other members 142 to 144 may be used. As such, any one of the first member to the fourth member 141 to 144 may include the tab accommodating portion 146 for accommodating the non-coated protruding portion or tab 112 of the electrode plate 110.

Meanwhile, the insulating polymer film 140 may include the four members 141 to 144 or may include at least two members. For example, the insulating polymer film 140 may include two members formed by integrating the first member 141 and the second member 142 as one body and integrating the third member 141 and the fourth member 144 as one body. Otherwise, the insulating polymer film 140 may include the second member to the fourth member 142 to 144 integrated as one body and the first member 141. The number of members constituting the insulating polymer film 140 may be selected considering design factors such as a size or a shape of the electrode plate.

The first member to the fourth member 141 to 144 of the insulating polymer film 140 may be arranged to be in close contact with the adjacent members. While the first member to the fourth member 141 to 144 are in close contact with each other without a gap between the adjacent members in order to form the accommodating space 145 of the electrode plate 110, they may be bonded to any one of the first or second separator film 120 or 130. That is, the members may be formed to be in close contact with each other without a gap g illustrated in FIG. 2. Herein, if the members are in close contact with each other, an adhesive may be supplied to a bonding surface between the adjacent members. As such, since each member is in close contact with its adjacent member, it is possible to form the accommodating space 145 in the same form as obtained by punching the insulating polymer film 140.

Further, if necessary, the first member to the fourth member 141 to 144 may be arranged to have the gap g between the adjacent members. Since the gap g is formed between the adjacent members, even if there is a slight error in size of the first to fourth members 141 to 144 or in size of the electrode plate 110, the electrode plate 110 can be accommodated in the accommodating space 145. Further, the adhesive infiltrates through the gap g formed between the adjacent members, so that the members can be firmly bonded to each other. Herein, if the gap g is formed, preferably, a size of the gap g may be 0.1 mm or less.

The first member to the fourth member 141 to 144 are prepared by cutting or processing the insulating polymer film 140 according to a size of the electrode plate 110, and the members having the same shape may be loaded in a cartridge (not illustrated). The members loaded in the cartridge may be placed on the separator film by a member transfer device (not illustrated) including an adsorption unit.

Meanwhile, since the members 141 to 144 of the insulating polymer film 140 are separated from each other, it is important to form the accommodating space 145 for accommodating the electrode plate 110 in the insulating polymer film 140. That is, the accommodating spaces 145 having the same size or shape should be repeatedly formed by arranging the members 141 to 144.

Before the electrode plate 110 is accommodated in the accommodating space 145 formed by the members 141 to 144, the positions of the respective members 141 to 144 should be fixed. To do so, the both surfaces of the first member to the fourth member 141 to 144 in the thickness direction may be coated with the adhesive. Otherwise, the first separator film 120 and the second separator film 130 facing the both surfaces of the first member to the fourth member 141 to 144 in the thickness direction may be coated with the adhesive. As such, by coating the members 141 to 144 or the separator films 120 and 130 with the adhesive, it is possible to bond and fix the members 141 to 144 to any one of the separator films, so that the accommodating spaces 145 can be stably secured and the electrode plate 110 can be accommodated in the accommodating spaces 145.

Referring to FIG. 1, the first separator film 120 is positioned above the first to fourth members 141 to 144 and the second separator film 130 is positioned under the first to fourth members 141 to 144. In this state, the members 141 to 144 are primarily fixed to the second separator film 130 positioned thereunder, and then, the electrode plate 110 may be accommodated in the accommodating spaces 145. In FIG. 1, contact portions 138 to which the first to fourth members 141 to 144 are bonded are expressed on the second separator film 130.

In order to bond and fix the first to fourth members 141 to 144 to the contact portions 138 of the second separator film 130, the contact portions 138 or the first to fourth members 141 to 144 corresponding thereto need to be coated with the adhesive. The adhesive needs to be coated on the predetermined regions in a uniform amount, and, thus, it is necessary to use an automated adhesive coating device.

The wrapping electrode assembly 100 according to the exemplary embodiment of the present invention may coat the adhesive on the insulating polymer film 140 or the separator film 130 using an adhesive injecting device 150 illustrated in FIG. 3. The adhesive injecting device 150 may include an X-axis stage 152, a Y-axis stage 151 moving along the X-axis stage 152 in an X-axis direction, a nozzle stage 153 moving along the Y-axis stage 151 in a Y-axis direction, and a nozzle unit 154 which can be rotated on the nozzle stage 153 and includes multiple injection nozzles.

The nozzle unit 154 of the adhesive injecting device 150 may be provided so as to face the contact portions 138 of the second separator film 130. That is, while the nozzle unit 154 is positioned above the contact portions 138 of the second separator film 130, the nozzle stage 153 moves in the X-axis or Y-axis direction and the contact portions 138 are coated with the adhesive.

The adhesive may be coated on surfaces of the members 141 to 144. In this case, preferably, the members 141 to 144 may be positioned above the nozzle unit 154.

As such, after the contact portions 138 of the second separator film 130 are coated with the adhesive, the members 141 to 144 are placed on the contact portions 138 by the member transfer device. If time elapses after the members 141 to 144 are placed on the contact portions 138 coated with the adhesive, the members 141 to 144 are bonded and fixed to the second separator film 130. In this state, the electrode plate 110 can be accommodated in the accommodating space 145.

After the electrode plate 110 is positioned in the accommodating space 145, the first separator film 120 and the insulating polymer film 140 are bonded to each other so as to be sealed. In order to bond the first separator film 120 to the members 141 to 144, the adhesive may be coated on the first separator film 120 or the surfaces of the members 141 to 144, or if necessary, a separate adhesive may not be coated. If the insulating polymer film 140 and the members 141 to 144 contain an adhesive component, a separate adhesive may not be coated.

In a state where the electrode plate 110 is accommodated within the members 141 to 144, upper surfaces of the members 141 to 144 can be bonded to the first separator film 120 by a pressure roller 160 illustrated in FIG. 5. In a state where the electrode plate 110 is accommodated in the accommodating space 145 of the insulating polymer film 140, the first separator film 120 and the second separator film 130 can be bonded to the insulating polymer film 140 by heating outer surfaces of the first separator film 120 and the second separator film 130 while pressing them with the pressure roller 160. Herein, an adhesive component contained in the insulating polymer film 140 infiltrates into the first separator film 120 and the second separator film 130 and thus bonds the insulating polymer film 140 to the first separator film 120 and the second separator film 130.

In a state where the first separator film 120 and the second separator film 130 are bonded to the insulating polymer film 140, the bonded structure is cut along lines (refer to dotted lines) illustrated in FIG. 4, thereby obtaining a wrapping electrode assembly 100 illustrated in FIG. 6. Herein, a distance D between the cutting lines is a length of the wrapping electrode assembly 100.

The electrode plate 110 coated by the first separator film 120 and the second separator film 130 may be formed to have a size smaller than a size of another electrode plate which is not coated by the first separator film 120 and the second separator film 130. That is, the width of the electrode plate 110 constituting the wrapping electrode assembly 100 may be smaller than a width of the bare electrode plate (not illustrated). In other words, if a secondary battery is manufactured by the electrode-stacking method, preferably, a size of the wrapping electrode assembly 100 may not be smaller than a size of the bare electrode plate and an area of the bare electrode plate may be greater than a coating area of an active material on the electrode plate 110 of the wrapping electrode assembly 100 in order to prevent edge mismatch between active surfaces of the wrapping electrode assembly 100 and the bare electrode plate and to maintain a smooth stacking alignment.

The first separator film 120 or the second separator film 130 constituting the wrapping electrode assembly 100 may be formed to have the maximum projected area so as to be equivalent to that of the bare electrode plate. If the edge of the wrapping electrode assembly 100 is matched with the edge of the bare electrode plate, an projected area of the first separator film 120 or the second separator film 130 constituting the wrapping electrode assembly 100 is equivalent to that of the bare electrode plate.

The insulating polymer film 140 constituting the wrapping electrode assembly 100 may include any one selected from the group consisting of a polyolefin resin film, a polyester resin film, a polystyrene resin film, a polyimide film, a polyamide film, a fluorocarbon resin film, an ABS film, a polyacrylic film, an acetal-based film, and a polycarbonate film.

Further, preferably, the insulating polymer film 140 may contain any one adhesive component selected from a high temperature fused adhesive group consisting of ethylene vinyl acetate, ethylene ethyl acetate, an ethylene acrylic acid-based compound, an ionomer-based compound, polyethylene, polyvinylacetate, and polyvinylbutyral.

Meanwhile, referring to FIG. 5 and FIG. 7, it can be seen that a gap having a predetermined size is formed between the electrode plate 110 and the members 141 to 144. That is, preferably, the accommodating space 145 may be formed to be larger than the electrode plate 110. Thus, when the electrode plate 110 is accommodated in the accommodating spaces 145, it is possible to prevent the electrode plate 110 from being tightly caught in the accommodating space 145 or any one of the electrode plate 110 and the accommodating space 145 from being damaged from contact therebetween.

Hereinafter, there will be described a method for manufacturing a wrapping electrode assembly according to an exemplary embodiment of the present invention.

According to another aspect of the present invention, the present invention may provide a method for manufacturing a wrapping electrode assembly 100 for use in a secondary battery manufactured by an electrode-stacking method, the method including: a step of preparing a plurality of electrode plates 110 having the same shape, each of which has a coating layer of an electrode active material and a non-coated protruding portion 112, the electrode active material being capable of reversibly inserting and extracting lithium ions; a step of preparing an insulating polymer film 140 which is formed as being divided into at least two parts so as to form a space 145 for accommodating the electrode plate 110; a step of preparing tape-shaped first separator film 120 and second separator film 130 each positioned on upper surfaces and lower surfaces of the electrode plate 110 and the insulating polymer film 140; a step of bonding any one separator film 130 positioned under the insulating polymer film 140 among the first separator film 120 and the second separator film 130 to the insulating polymer film 140; a step of positioning the electrode plate 110 within the space 145 formed by the insulating polymer film 140; and a step of bonding the other one separator film 120 positioned on the insulating polymer film 140 among the first separator film 120 and the second separator film 130 to the insulating polymer film 140.

In the step of bonding any one separator film 130 (second separator film) positioned under the insulating polymer film 140 among the first separator film 120 and the second separator film 130 to the insulating polymer film 140, the one separator film 130 positioned under the insulating polymer film 140 and members 141 to 144 among the first separator film 120 and the second separator film 130 or the insulating polymer film 140 may be coated with an adhesive, and then, the insulating polymer film 140 and the members 141 to 144 may be positioned on the separator film 130 so as to form the space 145 for accommodating the electrode plate 110.

As such, after the contact portions 138 of the second separator film 130 are coated with the adhesive, the members 141 to 144 are placed on the contact portions 138 by the member transfer device. If time elapses after the members 141 to 144 are placed on the contact portions 138 coated with the adhesive, the members 141 to 144 are bonded and fixed to the second separator film 130. In this state, the electrode plate 110 can be accommodated in the accommodating space 145.

In the step of bonding any one separator film 130 positioned under the insulating polymer film 140 among the first separator film 120 and the second separator film 130 to the insulating polymer film 140, a first member to a fourth member 141 to 144 of the insulating polymer film 140 respectively arranged on side surfaces of the electrode plate 110 along a thickness direction may be coated with an adhesive using an adhesive injecting device 150 configured to inject the adhesive along a longitudinal direction of the first member to the fourth member 141 to 144.

In the step of bonding the other one separator film 120 (first separator film) positioned on the insulating polymer film 140 among the first separator film 120 and the second separator film 130 to the insulating polymer film 140, the insulating polymer film 140 and the members 141 to 144 may be allowed to pass through a pressure roller 160 while being heated the separator film 120. In a state where the electrode plate 110 is accommodated in the accommodating space 145 of the insulating polymer film 140, the first separator film 120 and the second separator film 130 can be bonded to the insulating polymer film 140 by heating outer surfaces of the first separator film 120 and the second separator film 130 while pressing them with the pressure roller 160. Herein, an adhesive component contained in the insulating polymer film 140 infiltrates into the first separator film 120 and the second separator film 130 and thus bonds the insulating polymer film 140 to the first separator film 120 and the second separator film 130. Herein, the insulating polymer film 140 and the first to fourth members 141 to 144 may include any one selected from the group consisting of a polyolefin resin film, a polyester resin film, a polystyrene resin film, a polyimide film, a polyamide film, a fluorocarbon resin film, an ABS film, a polyacrylic film, an acetal-based film, and a polycarbonate film.

Further, the insulating polymer film 140 and the first to fourth members 141 to 144 may contain any one adhesive component selected from a high temperature fused adhesive group consisting of ethylene vinyl acetate, ethylene ethyl acetate, an ethylene acrylic acid-based compound, an ionomer-based compound, polyethylene, polyvinylacetate, and polyvinylbutyral.

An electrode assembly is manufactured by alternately stacking the multiple wrapping electrode assemblies 100 and bare electrode plates (not illustrated, non-wrapped electrode plates) prepared by the above-described method, and then put into a can and sealed with a cap, so that a secondary battery can be obtained.

Meanwhile, preferably, the electrode plate 110 constituting the wrapping electrode assembly 100 may be a cathode electrode plate and the bare electrode plate may be an anode electrode plate, but may not be limited thereto. If an anode electrode plate is allowed to be greater than a cathode electrode plate, the wrapping electrode assembly may be an anode electrode plate and the bare electrode plate may be a cathode electrode plate.

As described above, according to the wrapping electrode assembly and the method for manufacturing the same of the exemplary embodiments of the present invention, it is not necessary to punch or perforate the insulating polymer film, and, thus, it is possible to prevent the insulating polymer film from being wasted.

While the exemplary embodiments of the present invention have been described above with reference to specific matters such as the concrete elements and the definitive embodiments and drawings, these exemplary embodiments are provided only for the general understanding of the present invention but not intended to limit the present invention. It should be noted by those skilled in the art that various modifications and changes can be made from the above description. Therefore, the concept of the present invention should not be limited to the above-described exemplary embodiments, but the following claims and all equivalents or modifications thereof will be construed as being included in the scope of the concept of the present invention.

The present invention can be used for secondary batteries, energy storage systems, or the like.

The invention claimed is:

1. A wrapping electrode assembly for use in a secondary battery manufactured by an electrode-stacking method, the wrapping electrode assembly comprising:
   an electrode plate which has a coating layer of an electrode active material, the electrode active material being capable of reversibly inserting and extracting lithium ions, the electrode plate including an upper surface, a lower surface, side surfaces, and a non-coated protruding portion or a tab formed in one of the side surfaces;
   first and second separator films which cover the upper surface and the lower surface, respectively, of the electrode plate while exposing at least part of the non-coated protruding portion; and
   an insulating polymer film which is positioned between the first separator film and the second separator film for at least a portion of the electrode plate to be bonded to the first separator film and the second separator film,
   wherein the insulating polymer film includes a first member, a second member, a third member and a fourth member arranged to surround the side surfaces of the electrode plate,
   any one member among the first member, the second member, the third member and the fourth member includes a tab accommodating portion for accommodating the non-coated protruding portion or the tab of the electrode plate,
   the any one member has a width larger than those of the other members, and
   any one of the first separator and the second separator includes contact portions to which the first member, the second member, the third member and the fourth member are bonded.

2. The wrapping electrode assembly of claim 1, wherein upper surfaces and lower surfaces of the first member, the second member, the third member and the fourth member are coated with an adhesive.

3. The wrapping electrode assembly of claim 1, wherein the contact portions are coated with an adhesive.

4. The wrapping electrode assembly of claim 1, wherein the first member, the second member, the third member and the fourth member are arranged to be in close contact with adjacent members.

5. The wrapping electrode assembly of claim 1, wherein the first member, the second member, the third member and the fourth member are arranged to have a gap between adjacent members.

6. The wrapping electrode assembly of claim 1, wherein the insulating polymer film includes any one selected from the group consisting of a polyolefin resin film, a polyester resin film, a polystyrene resin film, a polyimide film, a polyamide film, a fluorocarbon resin film, an ABS film, a polyacrylic film, an acetal-based film, and a polycarbonate film.

7. The wrapping electrode assembly of claim 6, wherein the insulating polymer film contains a high temperature fused adhesive component formed of any one selected from the group consisting of ethylene vinyl acetate, ethylene ethyl acetate, an ethylene acrylic acid-based compound, an ionomer-based compound, polyethylene, polyvinylacetate, and polyvinylbutyral.

* * * * *